(12) United States Patent
Yanagimoto

(10) Patent No.: US 11,580,787 B2
(45) Date of Patent: Feb. 14, 2023

(54) DEVICE FOR MEASURING PASSING TIME OF RUNNER

(71) Applicant: YY-FACTORY INC., Kobe (JP)

(72) Inventor: Yoshiyuki Yanagimoto, Kobe (JP)

(73) Assignee: YY-FACTORY INC., Kobe (JP)

( * ) Notice: Subject to any disclaimer, the term of this patent is extended or adjusted under 35 U.S.C. 154(b) by 947 days.

(21) Appl. No.: 16/324,980

(22) PCT Filed: Aug. 14, 2017

(86) PCT No.: PCT/JP2017/029268
§ 371 (c)(1),
(2) Date: Feb. 12, 2019

(87) PCT Pub. No.: WO2018/034263
PCT Pub. Date: Feb. 22, 2018

(65) Prior Publication Data
US 2019/0188922 A1 Jun. 20, 2019

(30) Foreign Application Priority Data

Aug. 15, 2016 (JP) .............................. JP2016-170198

(51) Int. Cl.
*G07C 1/24* (2006.01)
*G01S 17/06* (2006.01)
(Continued)

(52) U.S. Cl.
CPC ............ *G07C 1/24* (2013.01); *A63B 69/0028* (2013.01); *A63B 71/06* (2013.01);
(Continued)

(58) Field of Classification Search
CPC . G07C 1/24; G01S 17/04; G01S 17/06; G01S 7/4808; G01S 7/51; A63B 69/0028;
(Continued)

(56) References Cited

U.S. PATENT DOCUMENTS 4,823,367 A * 4/1989 Kreutzfeld ......... A63B 71/0686
377/5
7,951,045 B1 * 5/2011 Brader ................... A63B 71/06
482/3
(Continued)

FOREIGN PATENT DOCUMENTS

JP 2005-87409 A 4/2005
JP 2011-172895 A 9/2011
(Continued)

OTHER PUBLICATIONS

International Search Report dated Sep. 19, 2017, issued in counterpart International Application No. PCT/JP2017/029268, with English Translation (6 pages).
(Continued)

*Primary Examiner* — Allen Chan
(74) *Attorney, Agent, or Firm* — WHDA, LLP

(57) ABSTRACT

To provide a device for measuring a time of passage that is capable of sensing passage of the torso more accurately than a photoelectric cell while maintaining the ease of use of a photoelectric cell, passage of a runner is sensed by causing the upper portion of the body of the runner to be broadly illuminated by infrared light, visible light, and/or other such electromagnetic waves, and by detecting light reflected from large part(s) of the body of the runner.

4 Claims, 15 Drawing Sheets

(51) Int. Cl.
    *A63B 71/06*    (2006.01)
    *G04F 10/00*    (2006.01)
    *G01S 17/04*    (2020.01)
    *A63B 69/00*    (2006.01)
    *G01S 7/48*     (2006.01)
    *G01S 7/51*     (2006.01)

(52) U.S. Cl.
    CPC ........ *A63B 71/0686* (2013.01); *G01S 7/4808* (2013.01); *G01S 7/51* (2013.01); *G01S 17/04* (2020.01); *G01S 17/06* (2013.01); *G04F 10/00* (2013.01); *A63B 2071/0688* (2013.01)

(58) Field of Classification Search
    CPC ................ A63B 71/06; A63B 71/0686; A63B 2071/0688; G04F 10/00
    USPC ........................................................ 434/255
    See application file for complete search history.

(56) References Cited

U.S. PATENT DOCUMENTS 8,618,919 B2 * 12/2013 Duxbury ................. G01S 17/04
    368/2
2015/0116497 A1 * 4/2015 Doval ..................... G01S 7/412
    348/157

FOREIGN PATENT DOCUMENTS

| JP | 2013-553 A | 1/2013 |
| JP | 6326602 B2 | 5/2018 |
| WO | 2009/060551 A1 | 5/2009 |

OTHER PUBLICATIONS

Written Opinion of the International Searching Authority (Form PCT/ISA/237) dated Sep. 19, 2017, issued in counterpart International Application No. PCT/JP2017/029268(4 pages).

* cited by examiner

DEVICE FOR MEASURING PASSING TIME OF RUNNER

TECHNICAL FIELD

The present invention relates to a device that easily and accurately measures the time required for a runner to run a prescribed interval when practicing for a short-distance track-and-field event.

BACKGROUND ART

In the context of training for track and field events, accurate measurement of a runner's time is an extremely important element for acquiring an objective grasp of the ability of the runner and the results of training.

The "finish" in an official track and field event is defined as the moment when the trunk portion exclusive of the head, neck, arms, legs, hands, and feet of the runner (hereinafter "torso") has just reached the front edge of a 5-cm-wide finish line. It is therefore desirable during training as well to be able to carry out measurement that is close to this.

There are generally speaking three methods for measuring a runner's time that are in use at present. These are those which make use of a manually operated stopwatch, those which make use of a slit camera, and those which make use of a photoelectric cell.

With manually operated stopwatches, there is occurrence of extremely large errors due to the problem of human reaction time. As it is said that errors on the order of 0.2 second to 0.3 second typically occur, such errors exceed the acceptable tolerance for track and field events in which 0.01 second can make the difference between winning and losing.

Slit cameras have therefore been used in attempts to avoid the problem of measurement error. Slit cameras are extremely accurate. However, installation is too laborious to permit them to be relocated to another site. While there are some large sports stadiums at which these are permanently installed at the location of the goalposts, as the finish line typically employed during training is not necessarily the finish line that will be used during an athletic meet due to the need to coordinate with athletes of other events and/or the nature of training, there are many situations in which these cannot be used. Furthermore, there are problems in that an expert in the operation thereof is required to carry out such measurements; and also, because the image must be played back and the runner's time determined after the runner has finished the event, the runner must wait to learn what his or her time was. Furthermore, it is not possible to measure intermediate times of passage (lap times). For these reasons, use thereof has been limited to full-blown athletic meets, these not being suitable for use during training.

As a measurement device which is somewhat in-between the foregoing, i.e., one that is provided with both a moderate degree of accuracy and a moderate degree of ease-of-use, photoelectric cells are sometimes employed. As shown in FIG. 16, a photoelectric cell is such that an illumination device (21) that provides beam-like illumination in the form of infrared light and/or visible light (hereinafter "light") is installed at one side of the line that is to be measured, and a light-receiving device (22) that receives the light is installed at the other side thereof, such that when a runner (1) who travels past the prescribed line blocks the light, the light-receiving device (22) senses that fact, measurement of the runner's time being carried out in correspondence thereto. This constitutes an improvement in measurement accuracy as compared with manual measurement. But because light-receiving device (22) is sensitive only to illuminated light within an extremely small region, this has been fraught with occurrence of measurement error in that sensing occurs even when runner (1) causes the light to be blocked by a hand, arm, leg, or other such small part of the body.

There is also a device which is similar to a photoelectric cell and which might be called a "reflective photoelectric cell." While there are hardly any real-life examples in which these have actually been put into use, employment of a reflective photoelectric cell has been proposed (see Patent Reference No. 1). With a "reflective photoelectric cell," both the illumination device and the light-receiving device are installed to one side of the line across which passage is to be measured. An illumination device provides illumination in the form of infrared and/or visible light (hereinafter "light"), and light reflected by the clothing and/or body of a runner traveling therepast is detected by a light-receiving device, measurement of the runner's time being carried out in correspondence thereto. In accordance with this method as well, the light is such that either a laser or other such light in the form of a beam is employed, or a method might be employed in which a lens or the like is used to collect the light. At the foregoing Patent Reference, the method in which a lens is used to collect the light is employed. But regardless of which method is employed, this will have an error which is similar to that with a photoelectric cell. That is, the light being concentrated within a small region, it will strike and be reflected by not the torso of the runner but even by a hand, arm, or leg, which is detected by the light-receiving device and produces measurement error.

FIG. 15 shows an example of measurement error such as might occur with a photoelectric cell or "reflective photoelectric cell." With a photoelectric cell or "reflective photoelectric cell," the detected zone (23) for detecting passage of the runner is small. Therefore, the fact that runner (1) has "traveled therepast" will be sensed even when the palm of the hand which is a part of the body of runner (1) enters the small detected zone (23) as shown in FIG. 15. When running in an ordinary manner, the palm of the hand will lead the torso by a maximum of on the order of 50 cm. When converted into an equivalent time, the measurement error due such erroneous sensing will therefore be on the order of 0.05 second. For example, the men's finals in the 2015 National Sports Festival of Japan was a close match, there being five contestants having times in the 0.04 second between the winning time of 10.32 seconds and the fifth-ranked time of 10.36 seconds. While 0.05 second is a much smaller error than would be the case with manual measurement, it can hardly be said that this satisfies the requirements for the precision that one would really like to possess.

In this regard, a stratagem has been proposed for avoiding the "hand blocking" problem, i.e., the problem whereby erroneous sensing occurs as a result of blocking of photoelectric cell light by a hand or an arm (see Patent Reference No. 2). This is such that because the time during which the light is blocked by the hand is short, where there is a long time thereafter during which the light is blocked, this is judged to be the sensing of the torso. However, as it is often the case that hands and arms extend horizontally and it is possible that these will block the light for a long period of time, it cannot be said that a means for avoiding this problem has been provided.

PRIOR ART REFERENCES

Patent References

PATENT REFERENCE NO. 1: Japanese Patent Application Publication Kokai No. 2005-87409

PATENT REFERENCE NO. 2: Japanese Patent Application Publication Kokai No. 2011-172895

SUMMARY OF INVENTION

Problem to be Solved by Invention

A problem to be solved by the present invention is to provide a device for measuring a time of passage that is capable of sensing passage of the torso more accurately than a photoelectric cell while maintaining the ease of use of a photoelectric cell.

Means for Solving Problem

A first means in accordance with the present invention for solving the foregoing problem(s) is a device for measuring a time of passage of a runner characterized in that it comprises an illumination device that provides illumination by infrared and/or visible light, a light-receiving device that detects infrared and/or visible light, a communication device, a timer that measures a time, and a display device that displays the time; wherein infrared and/or visible illumination provided by the illumination device is reflected from the body of a runner traveling therepast, passage of the runner is sensed as a result of detection of reflected infrared and/or visible light by the light-receiving device, sensed information is conveyed to the timer by way of the communication device, the time of passage of the runner is measured by the timer in correspondence to the sensing, and the display device is a device that displays the measured time; wherein the illumination device comprises a step in which infrared and/or visible illumination extending across a region that is greater than or equal to the area of the palm of the hand of the runner at a location passed through by the runner is provided; and wherein passage of the runner is sensed when the light-receiving device detects electric power produced by reflected infrared and/or visible light that is greater than or equal to a prescribed value.

A second means in accordance with the present invention for solving the foregoing problem(s) is the device according to the first means in accordance with the present invention characterized in that the light-receiving device has a window that restricts direction of incidence thereon of infrared and/or visible light, wherein the window is shaped such that length thereof in a vertical direction is greater than length thereof in a horizontal direction.

A third means in accordance with the present invention for solving the foregoing problem(s) is the device according to the first or second means in accordance with the present invention characterized in that the illumination device has a window that restricts a region illuminated by infrared and/or visible light, wherein the region illuminated by infrared and/or visible light produced as a result of restriction by the window is shaped such that length thereof in a vertical direction is greater than length thereof in a horizontal direction.

In accordance with the present invention, an illumination device which provides illumination by infrared and/or visible light, and a light-receiving device which detects infrared and/or visible light, are installed at the same side relative to a runner. Characteristic of the illumination device is that it provides illumination by infrared and/or visible light in such fashion as to cause it to strike a broad area on the clothing and/or body of a runner traveling past in front thereof. Infrared and/or visible light illuminating a broad area is reflected by the body of the runner, infrared and/or visible light reflected from the respective locations of the body being incident on the light-receiving device. The light-receiving device senses passage of the runner when intensity of the infrared and/or visible light incident on the light-receiving device is greater than or equal to a prescribed value. With photoelectric cells and reflective photoelectric cells, attempts were made to increase measurement precision by making the region within which perception occurs be as small as possible. This is an idea found in the conventional art. It might be said that this was a method in which a binary determination was made as to whether the runner did or did not block the beam, for which reason one might say that it was a digital sensing method. In contradistinction thereto, the region within which perception occurs is made broader in the present invention. The method of the present invention—in which electric power produced by reflected light increases as the body of the runner increasingly enters the region within which perception occurs, and it is determined that the runner has been detected when the electric power produced by the reflected light reaches a prescribed value—might well be contrasted with the conventional art by considering that it is an analog sensing method. While one might think at first glance that such a method would result in a measurement precision that is less than that of the conventional art, as a result of diligent efforts and repeated experiments by the inventor(s) it was found that the method of the present invention on the contrary actually increases measurement precision, for which reason it may be said that it is a revolutionary invention which shatters conventional preconceptions.

Benefit of Invention

Means in accordance with the present invention make it possible to carry out measurement of a time of passage more accurately than with a conventional photoelectric cell while maintaining the ease of use of a photoelectric cell.

EMBODIMENTS FOR CARRYING OUT INVENTION

Below, embodiments for carrying out the present invention are described as appropriate with reference to the drawings below.

Working Example 1

Figure 1:
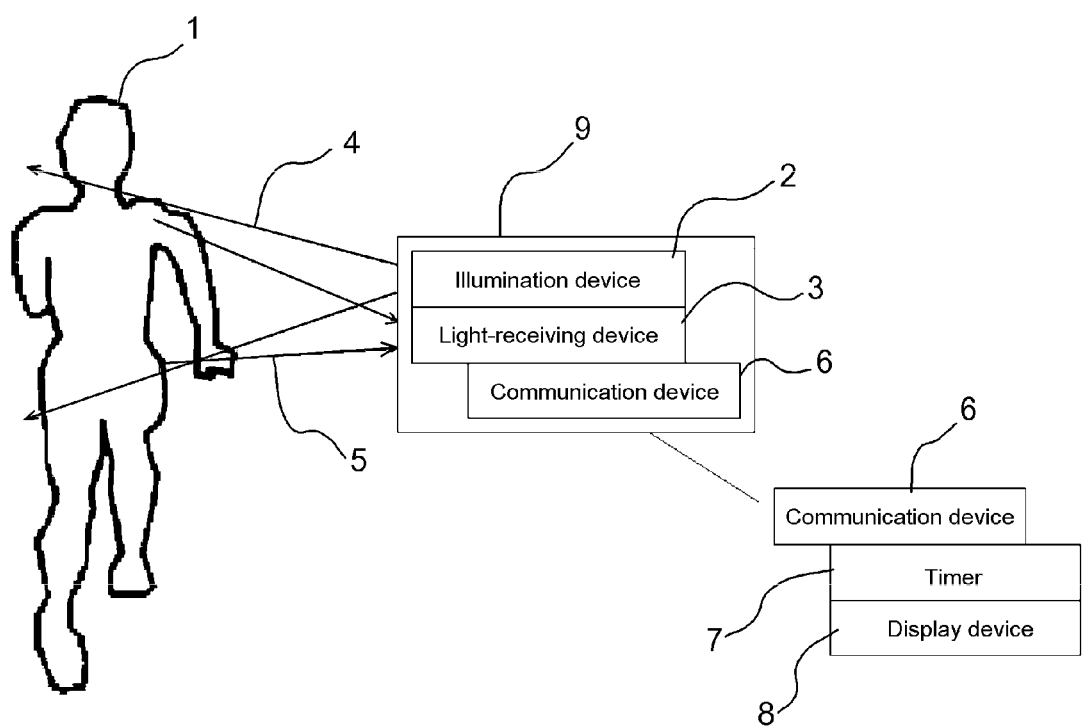
FIG. 1 Drawing for explaining overall constitution of the present invention.

As shown in FIG. 1, in accordance with a first embodiment for carrying out the present invention, an illumination device (2) which provides illumination by infrared and/or visible light (4), and a light-receiving device (3) which detects infrared and/or visible light, are installed at the same side relative to a runner (1). Characteristic of the illumination device (2) is that it provides illumination by infrared and/or visible light (4) in such fashion as to cause it to strike a broad area on the clothing and/or body of a runner (1) traveling past in front thereof. Infrared and/or visible light (4) illuminating a broad area is reflected by the body of runner (1), infrared and/or visible light (5) reflected from the respective locations of the body being incident on light-receiving device (3). Light-receiving device (3) senses passage of runner (1) when electric power from infrared and/or visible light (5) incident on light-receiving device (3) is greater than or equal to a prescribed value. After passage of runner (1) has been sensed, sensed information is communicated by way of communication device (6) to timer (7). Timer (7) measures the runner's time in correspondence thereto, and the runner's time is displayed by display device (8).

Figure 2:
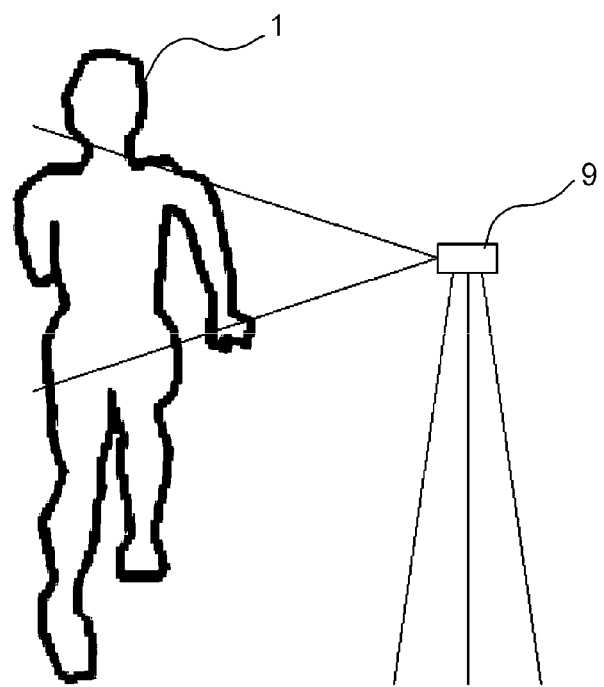
FIG. 2 Drawing of a region illuminated by infrared light which broadly illuminates the body of a runner, as seen from a location behind the runner.

When any portion of illumination device (2), light-receiving device (3), and communication device (6) at FIG. 1 are provided as an integral unit, this will improve ease of use thereof. Such an integral unit is referred to below as "sensing block (9)". While there is no limitation in the present invention with respect to the physical configuration of the respective devices, attaching sensing block (9) to a tripod or the like before use as shown in FIG. 2 will facilitate use thereof.

In accordance with the first embodiment for carrying out the present invention, infrared light of wavelength on the order of 900 nanometers to 1 micrometer is used as the electromagnetic waves that constitute the illumination. Because diffraction of infrared light in this wavelength domain is sufficiently low, measurement error due to diffraction can be ignored. Due to the proliferation of infrared remote controllers and infrared communication, it should be easy to obtain light-emitting element(s) and light-receiving element(s). With infrared LED(s), luminous efficiency is higher than would be the case with electromagnetic wave illumination devices of other wavelengths, and little battery consumption is required. While use of infrared light of this wavelength domain and employment of infrared LED(s) as infrared illumination device(s) are most suitable for fabrication in light of conditions such as the foregoing and given the present environment, this should not be interpreted as indicating that the wavelength(s) of the electromagnetic waves used or the device(s) employed by the present invention are limited thereto.

Figure 4:
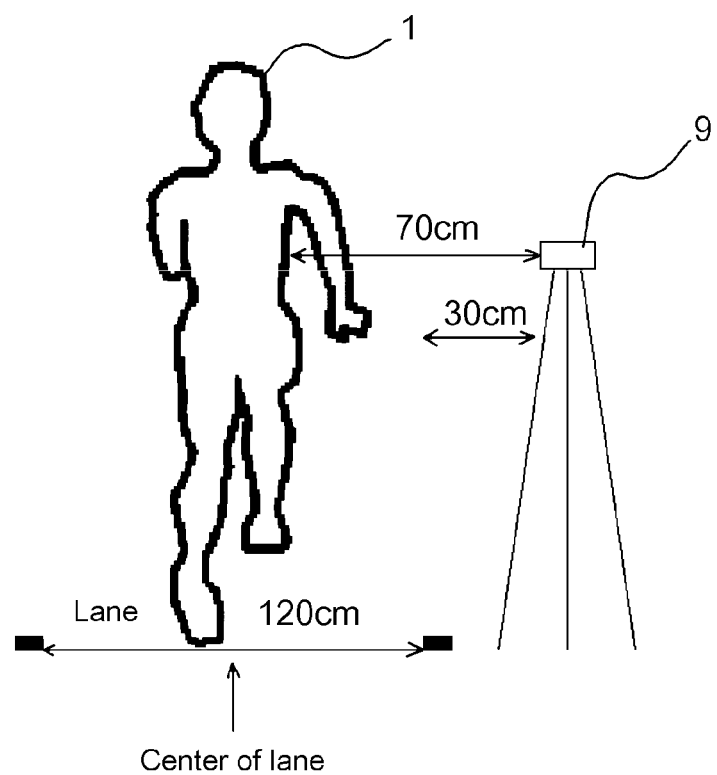
FIG. 4 Drawing for explaining location when a runner travels past while in the center of a lane.

A runner might run along the middle of a lane that is 120 cm in width. FIG. 4 shows the positional relationship among the lane, sensing block (9), and the body of runner (1) at a time when runner (1) is running along the center of a lane. An infrared illumination device might be installed at a location which is to the right side of the runner and which is separated by 30 cm from the right side of the lane. The distance between sensing block (9) and the right-side surface of the runner's torso when the runner (1) travels past while in the center of the lane will be approximately 70 cm.

Figure 5:
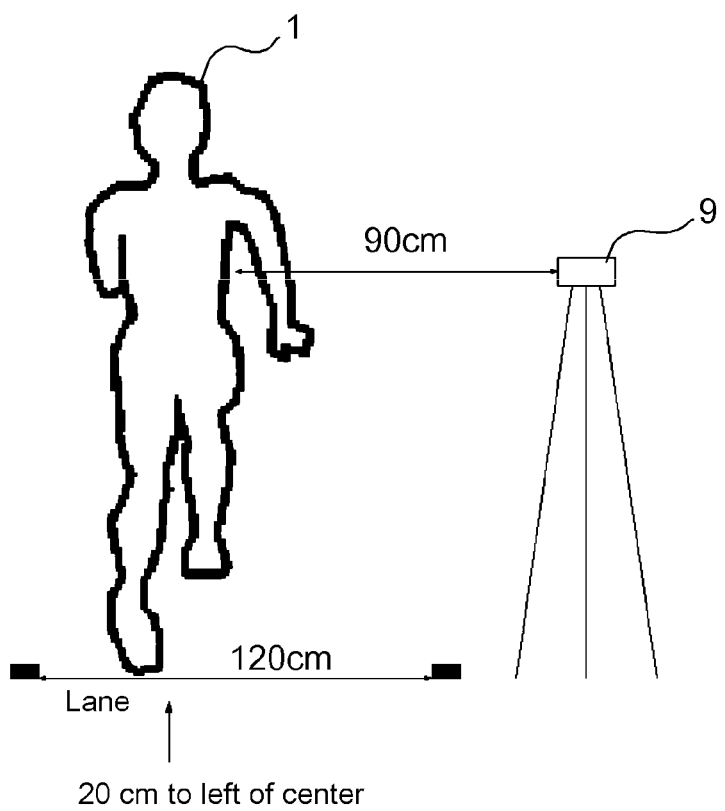
FIG. 5 Drawing for explaining location when an athlete travels past at a far location.
Figure 6:
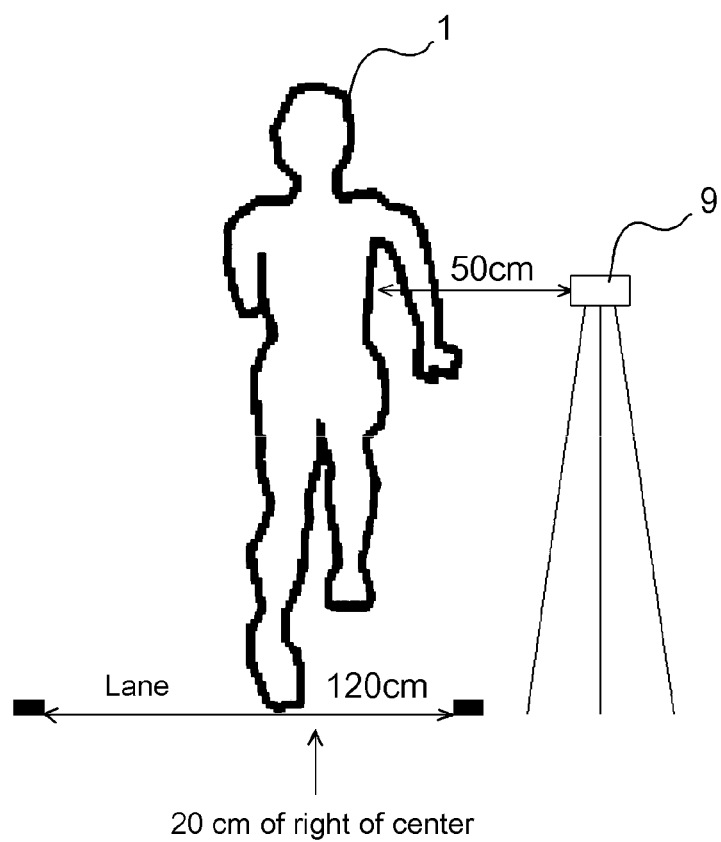
FIG. 6 Drawing for explaining location when an athlete travels past at a near location.

If the runner drifts to the left or right, the distance from sensing block (9) to the right-side surface of the torso of runner (1) will be approximately 90 cm when he or she drifts to the left as shown in FIG. 5, and will be approximately 50 cm when he or she drifts to the right as shown in FIG. 6. Because drift of any more than this would risk disqualification due to interference with the runner in the neighboring lane, running will normally take place within this region.

Figure 3:
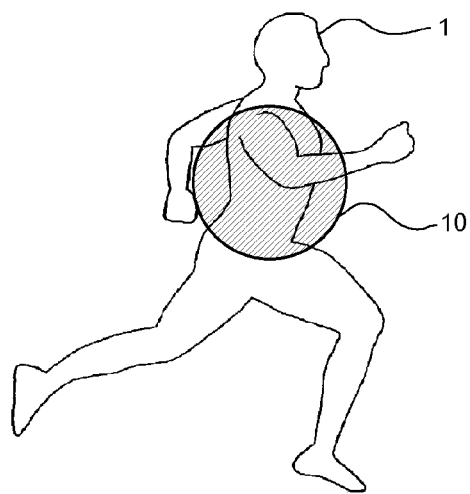
FIG. 3 Drawing of a region illuminated by infrared light which broadly illuminates the body of a runner, as seen from a location to the side of the runner.
Figure 19:
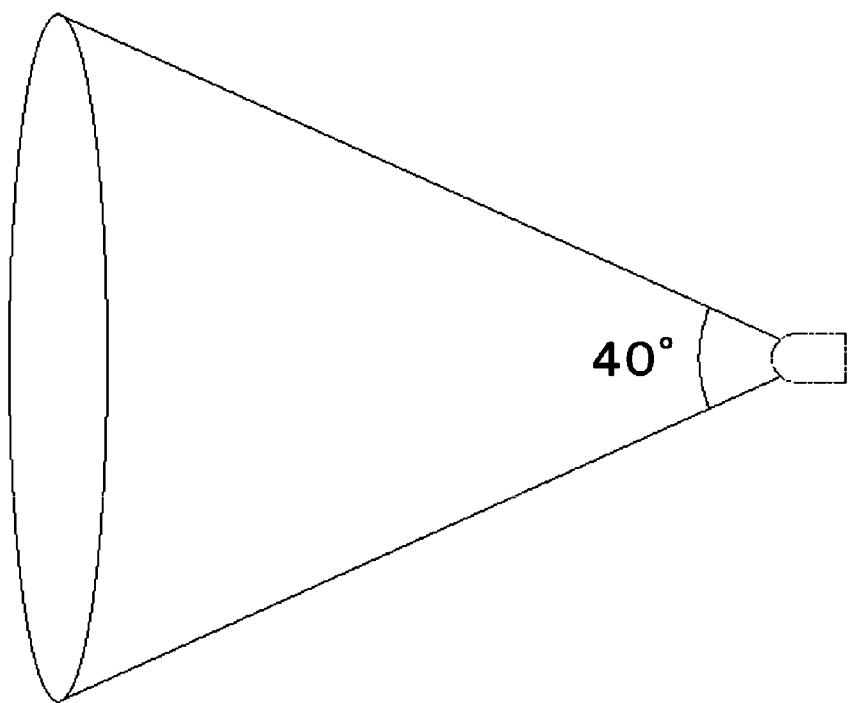
FIG. 19 Drawing for explaining the situation that exists when infrared illumination is provided in the shape of a cone having an apical angle of 40 degrees.

As illumination device (2), an infrared LED with an illumination angle of 20 degrees might, for example, be employed. As indicated at FIG. 19, the region illuminated by infrared light will be in the shape of a cone having an apical angle of 40 degrees, which at a distance of 70 cm will produce a region illuminated by infrared light in the shape of a circle of diameter 51 cm. At a distance of 90 cm this will be a circle 66 cm in diameter, and at a distance of 50 cm this will be a circle 36 cm in diameter. When the runner travels past while in the center of the lane as indicated at FIG. 4, the illuminated region (10) will be a circle of such size as to very nearly cover the torso of the runner as indicated in FIG. 3.

The intensity of the infrared illumination which is provided by a point light source such as an LED will be inversely proportional to the square of distance. Therefore, the intensity of infrared illumination will be such that if the intensity at a distance of 70 cm from the illumination device is taken to be 1, then the intensity at a distance of 50 cm will be approximately 2.0, and the intensity at a distance of 90 cm will be approximately 0.6.

And with respect to the reflected light, while the intensity of reflected infrared light that reaches the light-receiving device will be weak when the body of the runner, which is the reflection source, is far from the light-receiving device, because it is reflection from a surface, it will not be as weak as might be expected based on inverse proportionality to the square of distance but it can be expected to be roughly inversely proportional to distance. Assuming that infrared light of equal intensity is being reflected, if the intensity that reaches the light-receiving device when reflected from the center of the lane is taken to be 1, then the intensity after traversing a distance of 50 cm will be 1.4, and the intensity after traversing a distance of 90 cm will be 0.8.

Taking all of the foregoing into consideration, the intensity of the reflected infrared light that reaches the light-receiving device when infrared illumination provided by an illumination device is reflected from the body of a runner traveling past may be summarized as follows. To wit, taking the intensity of the reflected infrared light per unit projected area of a runner when the runner travels past while in the center of the lane to be 1, the intensity of the reflected infrared light per unit projected area at a distance of 50 cm will be 2.8 (2.0×1.4), and the intensity of the reflected infrared light per unit projected area at a distance of 90 cm will be 0.48 (0.6×0.8).

At FIG. 7 to FIG. 10, the circle indicates the illuminated region (10) at the location of the right-side surface of the torso of a runner (1), the shaded region indicating that portion of the infrared illumination which is provided that strikes the body of the runner, it being reflection from this portion that is detected by the light-receiving device. The total intensity of reflected infrared light detected by the light-receiving device will therefore be proportional to the product of the area of the shaded region and the intensity of the reflected infrared light per unit projected area from that location.

When the runner (1) travels past while in the center of the lane shown in FIG. 4, while the distance from the sensing block to the right-side surface of the torso of runner (1) will be 70 cm and the illuminated region (10) will be a circle of diameter 51 cm at that location, the body of the runner will enter that region gradually as he or she travels past.

Figure 7:
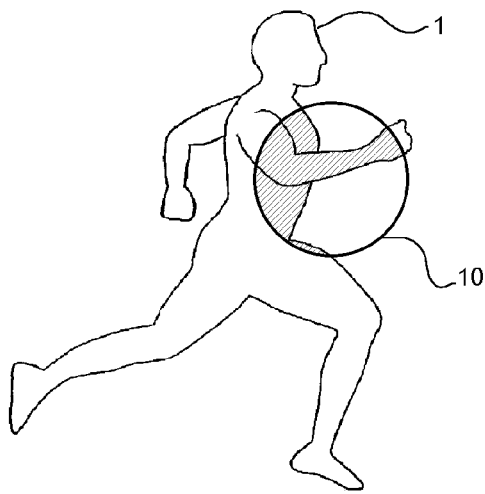
FIG. 7 Drawing for explaining the instant at which sensing occurs when a runner travels past while in the center of a lane.

Illumination intensity, and sensitivity of the light-receiving device, might, for example, be set so as to cause passage of the athlete to be sensed when a portion corresponding to 680 cm² of the projected area of the body of the runner (1) enters the illuminated region and the infrared light reflected therefrom is incident on the light-receiving device. In such case, if the runner is 170 cm in height, passage of the runner (1) will be sensed when the runner (1) arrives at a location such as is shown in FIG. 7. Whereas it would normally be the case that one would like sensing to occur when the torso of the runner (1) has just reached the center of the circle of illuminated region (10), sensing in FIG. 7 will occur at a location which is just slightly displaced relative thereto, which would constitute measurement error.

Figure 8:
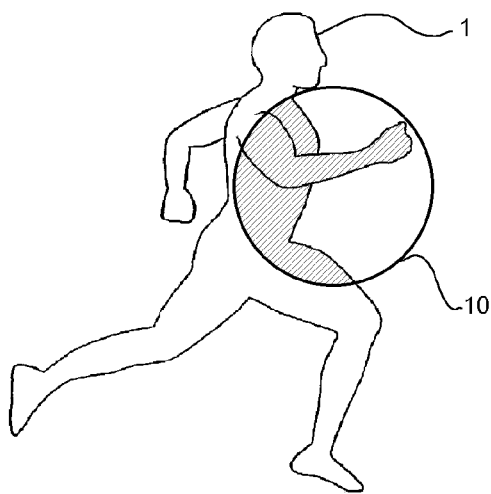
FIG. 8 Drawing for explaining the instant at which sensing occurs when a runner travels past at a far location.

FIG. 8 shows the situation that exists at the moment that sensing occurs when the runner (1) travels past at the farthest location which is shown in FIG. 5. The illuminated region (10) will be a circle of diameter approximately 66 cm, and the infrared light per unit projected area that is reflected from runner (1) will be at its weakest. Given the sensitivity setting mentioned above, passage of runner (1) will be sensed when 1400 cm² (680÷0.48) of the projected area of runner (1) enters illuminated region (10) as shown in FIG. 8. Under these conditions, the projected area required for sensing will be at a maximum.

Figure 9:
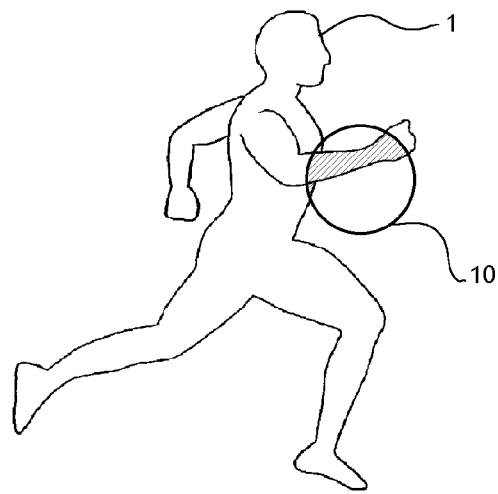
FIG. 9 Drawing for explaining the instant at which sensing occurs when a runner travels past at a near location.

FIG. 9 shows the situation that exists at the moment that sensing occurs when the runner (1) travels past at the nearest location which is shown in FIG. 6. The illuminated region (10) will be a circle of diameter approximately 36 cm, and the infrared light per unit projected area that is reflected from runner (1) will be at its strongest. Given the sensitivity setting mentioned above, passage of runner (1) will be sensed when 240 cm² (680÷2.8) of the projected area of runner (1) enters illuminated region (10) as shown in FIG. 9. Under these conditions, the projected area required for sensing will be at a minimum, FIG. 9 showing that an arm is enough to cause sensing to occur. Measurement error will be greatest at such a time.

Figure 10:
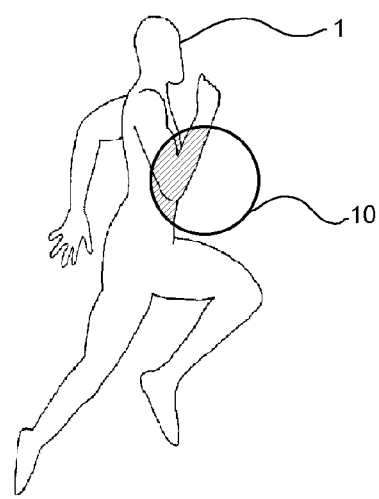
FIG. 10 Drawing for explaining the instant at which sensing occurs when a runner travels past at a near location while in a posture which is different from that of FIG. 9.

A runner (1) traveling past illuminated region (10) may be in any of a wide variety of postures. FIG. 10 shows the situation that exists when sensing occurs when an athlete travels past at the nearest location which is 50 cm with his or her elbow raised, in which case the location of the torso at the moment that sensing occurs will be nearer to the center of illuminated region (10), and measurement error will be less, than is the case in the situation of FIG. 9. But because there is no way to control the posture of the athlete at the moment that he or she travels past, the proper approach is to assume that the measurement error will be that which corresponds to the worst-case scenario for measurement error.

Based on the foregoing discussion, in the context of the first embodiment for carrying out the present invention, measurement error will be greatest when conditions are as at FIG. 9, and so an error of approximately 20 cm, or on the order of 0.02 second in terms of time, can be expected. This is much less than the error of 0.05 second that was estimated for the photoelectric cell at FIG. 15.

The foregoing discussion was based on an example in which the region illuminated by infrared light is in the shape of a cone having an apical angle of 40 degrees, which at a location at a distance of 70 cm from the illumination device will produce an illumination pattern in the shape of a circle of diameter 51 cm. The area of the illuminated region produced at such time will be 2040 cm². Moreover, an example was given in which passage of a runner was recognized by the infrared-light-receiving device if the projected area of the body of the runner entered a portion corresponding to 680 cm² or more thereof. With respect to the illuminated region, the illumination intensity, and/or the minimum projected area for which a runner is sensed by the light-receiving device, the present invention is not limited to the foregoing numeric values, it being possible for the intention of the present invention to be fulfilled through employment of numeric values other than those that have been presented by way of example above.

Figure 15:
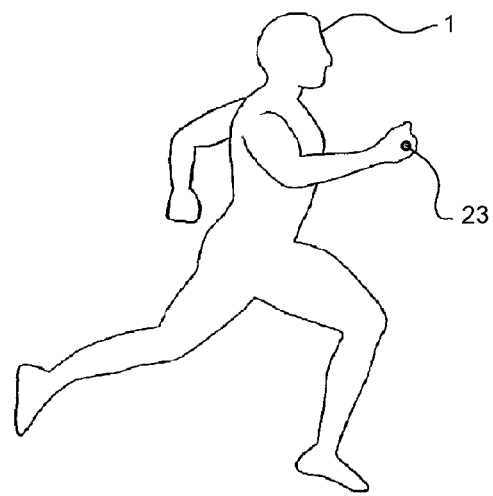
FIG. 15 Drawing for explaining situation that exists when hand of runner is sensed by photoelectric cell.
Figure 16:
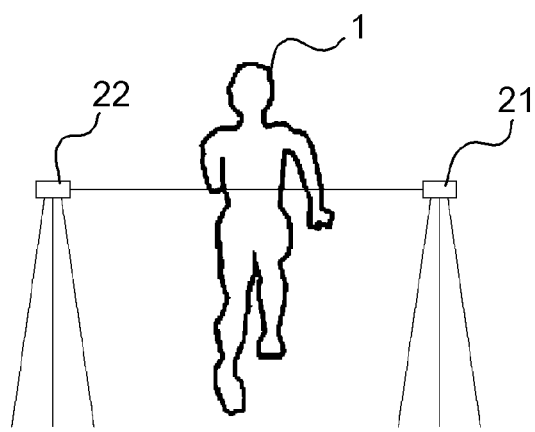
FIG. 16 Drawing for explaining how photoelectric cell might be installed.

However, if the illuminated region, or the minimum projected area for which a runner is sensed by the light-receiving device, were to be made exceedingly small, because this would result in a situation identical to that, such as is shown in FIG. 15, of the photoelectric cell or "reflective photoelectric cell," in that the palm of the hand would be sensed, this is not in keeping with the intention of the present invention. Where the illuminated region is larger than the palm of the hand of the runner, and the projected area required for the runner to be sensed by the light-receiving device is larger than the palm of the hand of the runner, detection of the runner will not occur unless a projected area that is larger than the area of the palm of the hand enters the illuminated region. That will be no occurrence of mistaken detection due to the palm of the hand. Inasmuch as this is a benefit of the present invention, the present invention is such that the inventive subject matter of the first means for solving the problem of the present invention does so in such fashion that the illumination device (2) comprises a step in which infrared and/or visible illumination is provided which is spread out so as to be as large as or larger than the palm of the hand of a runner.

Figure 17:
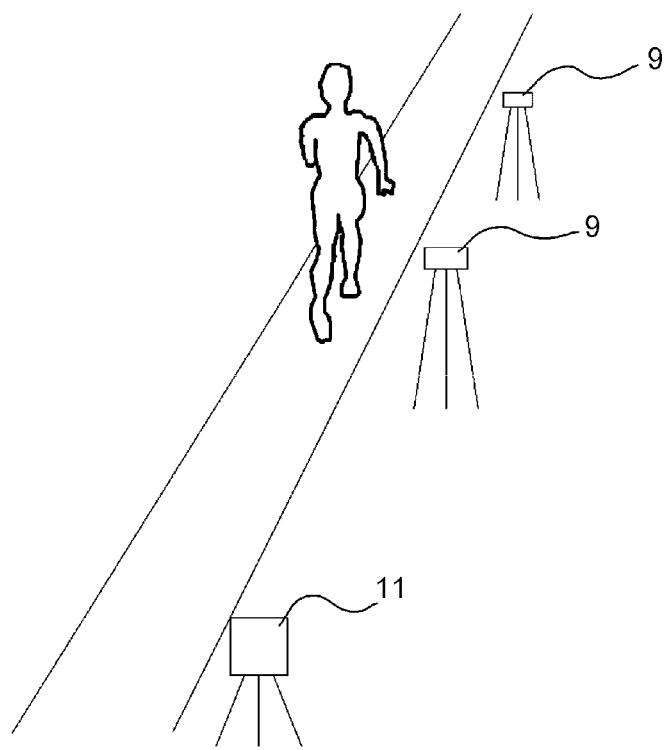
FIG. 17 Drawing for explaining situation in which runner's times from the starting point to an intermediate site that is passed through and to the finish line are measured.

When measuring a runner's time from the starting point until he or she travels past a designated site, as shown in FIG. 17, sensing block (9) is placed at the location which is desired to be measured, and a starting device (11) is separately employed. Starting device (11) has functionality for giving the starting signal and for simultaneously sending a measurement start instruction to timer (7) by way of the communication device. Runner (1) starts running at the starting signal, and thereafter passes in front of sensing blocks (9) which are arranged at various locations. Passage of the runner (1) is sensed, and the runner's time thereat is respectively measured, at each such location. A device in accordance with a means of the present invention makes it possible to accurately measure a runner's time without occurrence of mistaken detection due to the palm of the hand.

Figure 18:
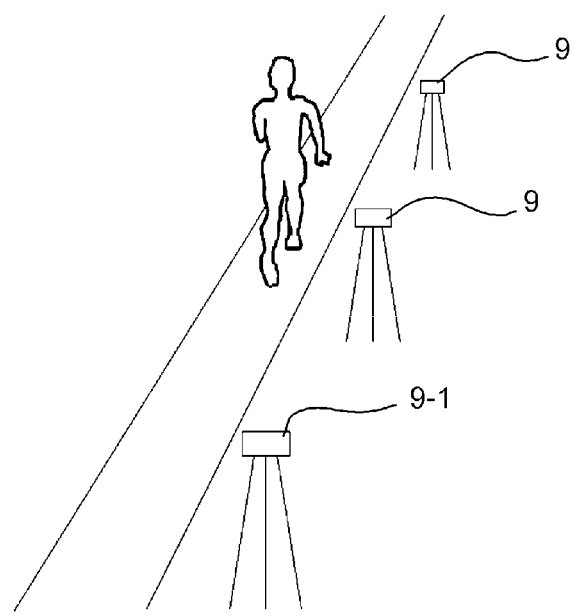
FIG. 18 Drawing for explaining the situation that exists when measuring a moving start.

Furthermore, there is also what might be called measurement of a "moving start". As shown in FIG. 18, when carrying out measurement of a moving start, sensing blocks (9, 9-1) are installed at a plurality of locations. Runner (1) begins to accelerate prior to reaching the first sensing block (9-1). When runner (1) travels past in front of the first sensing block (9-1), the first sensing block (9-1) senses the runner and sends an instruction by way of the communication device to cause the timer to begin measurement. Thereafter, as the runner (1) travels past in front of each successive sensing block (9) arranged at the respective locations, passage of the runner (1) is sensed, and the runner's times at each is respectively measured. A device in accordance with a means of the present invention makes it possible to accurately measure moving starts without occurrence of mistaken detection due to the palm of the hand.

Working Example 2

In the context of a second embodiment for carrying out the present invention, a situation such as that shown in FIG. 9 will result in the greatest amount of error. To wit, this is a situation in which the arm of a runner (1) who runs past at the nearest location is first to enter an illuminated region (10) which is a circle of diameter 36 cm. Furthermore, even when the runner (1) travels past while in the center of the lane, it will not be the case that the torso is perfectly sensed since as shown in FIG. 7 it is not possible to ignore the contribution of the arm to the total projected area, meaning that there will be error. The second embodiment for carrying out the present invention is an approach for avoiding this and for carrying out measurement more accurately.

The second embodiment for carrying out the present invention, which corresponds to the second means for solving the problem of the present invention, is such that a "window" has been added to the light-receiving device of the first embodiment for carrying out the present invention. Because it is in other respects the same as the first embodiment for carrying out the present invention, description will be given only with respect to those aspects that are different.

Figure 20:
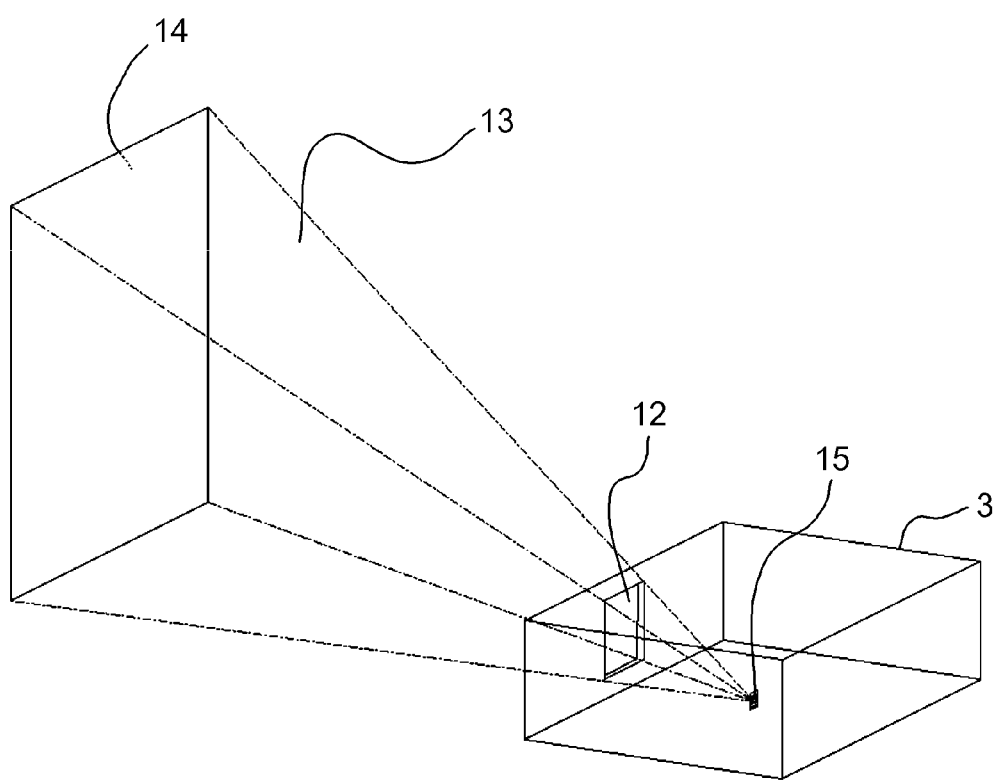
FIG. 20 Drawing for explaining the situation that exists when a "window" is installed at the front face of a light-receiving device to restrict the detected region.

The illumination device provides infrared illumination in the shape of a cone and the light-receiving device receives the infrared light reflected by the runner, at which time a restriction is applied with respect to the direction of the infrared light that is received thereby. This is what was referred to above as a "window," and what is also meant below where the expression "window" is used. As shown in FIG. 20, this "window" (12) constitutes an opening in front of light-receiving device (3) that causes this region to be restricted such that only reflected infrared light from region (13) which is a quadrangular pyramid reaches light-receiving sensor (15). As shown in the drawing, the cross-section of the quadrangular pyramid is a rectangle (14), this rectangle being characterized in that the length thereof in the vertical direction is greater than the length thereof in the horizontal direction.

Because its purpose is to reduce the influence of an arm that extends horizontally while managing to skillfully capture the torso of a human being which is long in the vertical direction, the "window" is not limited to being in the shape of a rectangle that is long in the vertical direction, it being possible to fulfill the intention of the present invention with an ellipse that is long in the vertical direction, a rounded rectangle that is long in the vertical direction, or with any or other such shape provided that it is long in the vertical direction. The present invention is not limited to "windows" of rectangular or any other such particular shape, nor is there any particular limitation with respect to the size thereof.

Figure 11:
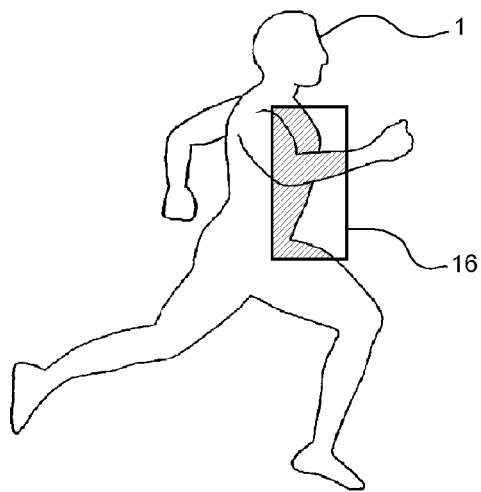
FIG. 11 Drawing for explaining the instant at which sensing occurs when a runner travels past while in the center of a lane in a situation where there is a "window."
Figure 12:
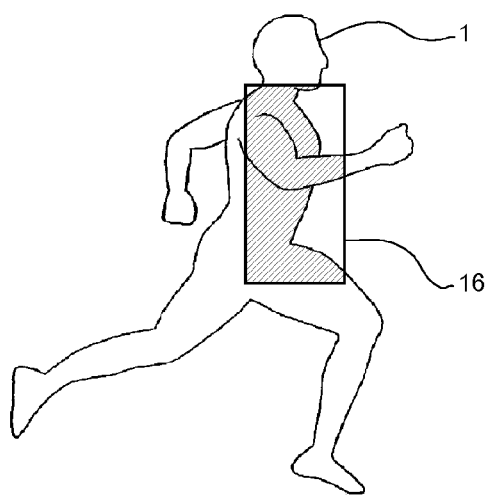
FIG. 12 Drawing for explaining the instant at which sensing occurs when a runner travels past at a far location in a situation where there is a "window."
Figure 13:
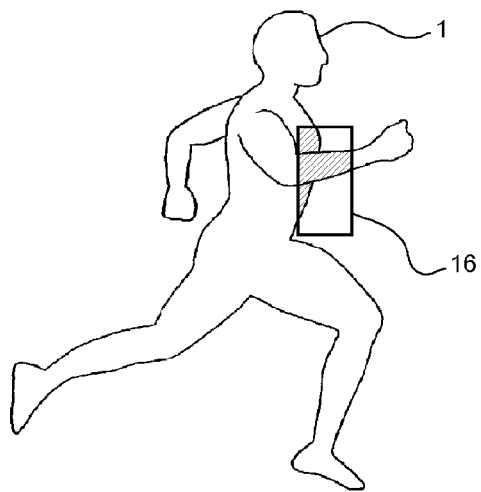
FIG. 13 Drawing for explaining the instant at which sensing occurs when a runner travels past at a near location in a situation where there is a "window."

At FIG. 11 through FIG. 13, as a result of the action of such "windows," light-receiving devices have detected regions (16) that are in the shapes of rectangles as shown in the drawings. Although not shown in the drawings, it is preferred that the infrared illumination which is provided be larger than detected regions (16). The shaded region indicates that portion of the infrared illumination which is provided that is reflected from the body of the runner and enters the "window." The intensity of reflected infrared light detected by the light-receiving device will therefore be proportional to the product of the area of the shaded region and the intensity of the reflected infrared light per unit projected area from that location.

FIG. 11 shows the situation that exists at the moment that sensing occurs when the runner (1) travels past while in the center of the lane as shown in FIG. 4. The detected region (16) will be in the shape of a rectangle which is 50 cm in height and 25 cm in width. FIG. 11 shows the instant at which passage of the runner will be sensed when the sensitivity of light-receiving device has been set so as to cause passage of the runner (1) to be sensed when 680 cm$^2$ of the projected area of the body of the runner (1) enters detected region (16).

FIG. 13 shows the situation that exists at the moment that sensing occurs when the runner (1) travels past at the farthest location as shown in FIG. 5. At such time, the detected region (16) will be in the shape of a rectangle which is 66 cm in height and 33 cm in width. Passage of runner (1) will be sensed when 1400 cm$^2$ of the projected area of runner (1) enters detected region (16) as shown in FIG. 13.

Figure 14:
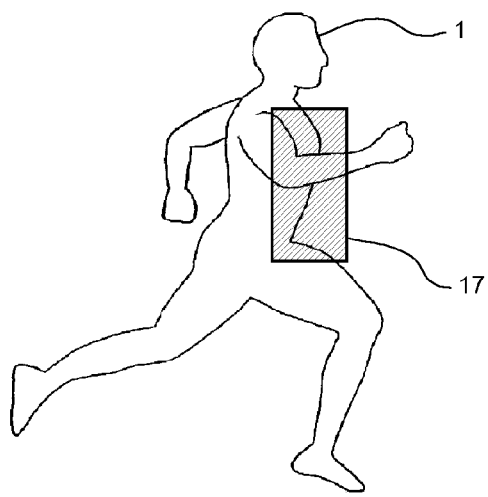
FIG. 14 Drawing for explaining region illuminated by infrared light when "window" is added to infrared illumination device.

FIG. 14 shows the situation that exists at the moment that sensing occurs when the runner (1) travels past at the nearest location as shown in FIG. 6. At such time, the detected region (16) will be in the shape of a rectangle which is 36 cm in height and 18 cm in width. Passage of runner (1) will be sensed when 240 cm$^2$ of the projected area of runner (1) enters detected region (16) as shown in FIG. 14.

Based on the foregoing discussion, in the context of the second embodiment for carrying out the present invention, measurement error will be greatest when the situation is as at FIG. 13, at which time the center of the detected region and the front surface of the torso of runner (1) just barely fail to coincide. However, given this situation, an error of 10 cm or less, or 0.01 second or less in terms of time, can be expected, which represents a further improvement over the 0.02-second error that was expected with the first embodiment for carrying out the present invention.

When a device in accordance with the second embodiment for carrying out the present invention was actually fabricated, it was found that the instant at which passage of a runner was sensed was such that, when compared with the results of high-speed camera photography, the difference that arose which was produced between the instant at which the runner was sensed by the foregoing device and the instant of passage of the torso as determined by the high-speed camera was 10 cm or less.

Working Example 3

Figure 21:
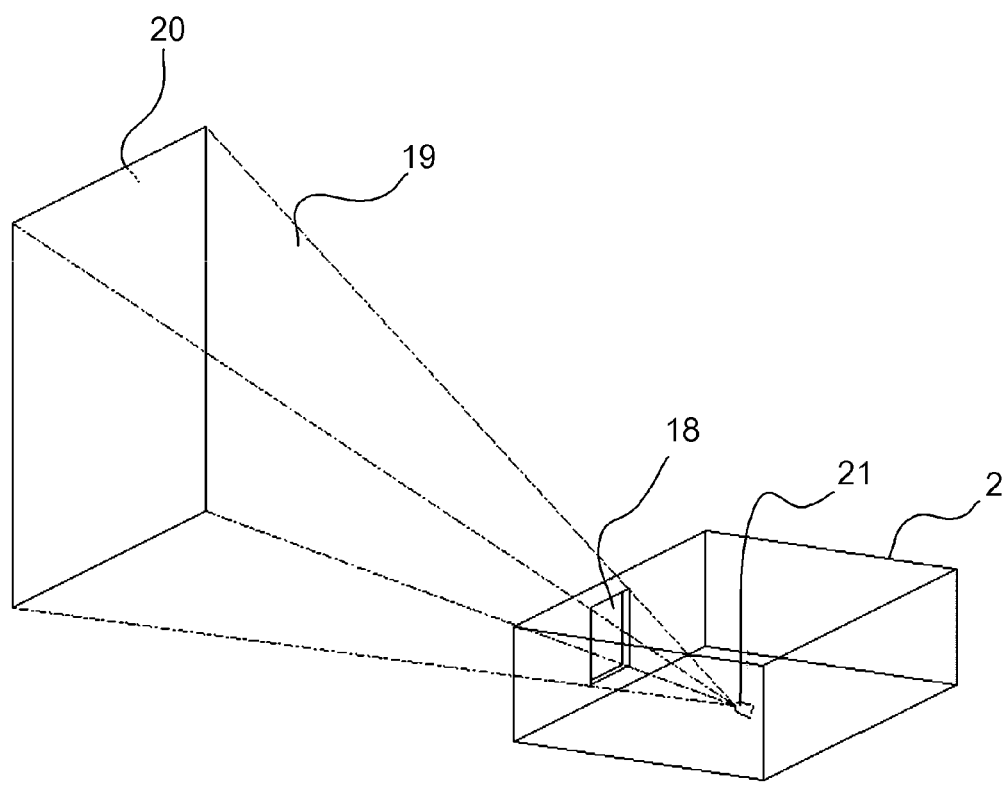
FIG. 21 Drawing for explaining the situation that exists when a "window" is installed at the front face of an illumination device to restrict the illuminated region.

The third embodiment for carrying out the present invention, which corresponds to the third means for solving the problem of the present invention, is such that a "window (18)" is provided at the illumination device (2) as shown in FIG. 21. The infrared illumination provided by infrared LED(s) (21) is such that the illuminated region produced by "window (18)" is constrained so as to be a region which is a quadrangular pyramid (19), the cross-section of which is a rectangle (20). For the same reason as at the second embodiment for carrying out the present invention, the shape of the illuminated region is characterized in that the length thereof in the vertical direction is greater than the length thereof in the horizontal direction, but there is no particular limitation with respect to the shape of the illuminated region in the present invention.

As shown in FIG. 14, the infrared illumination that is restricted by the "window" extends across a rectangular region (17) (the shaded region), passage of runner (1) being sensed due to the fact that the intensity of reflected light is sufficient therefor when the projected area of the body of a runner (1) passing through that illuminated region (17) exceeds a prescribed value. The mechanism by which such detection occurs and the effects thereof are as in the second embodiment for carrying out the present invention.

EXPLANATION OF REFERENCE NUMERALS

1 Runner
2 Illumination device
3 Light-receiving device
4 Infrared and/or visible light which is provided as illumination by illumination device 2
5 Infrared and/or visible light which is reflected by the body of an athlete and which is incident on light-receiving device 3
6 Communication device
7 Timer
8 Display device
9 Sensing block
9-1 First sensing block
10 Illuminated region
11 Starting device
12 Window for restricting detected region
13 Quadrangular pyramidal region indicating detected region which is produced as a result of restriction by window 12
14 Rectangle constituting cross-section of quadrangular pyramidal region 13 which is detected region
15 Light-receiving sensor
16 Detected region
17 Illuminated region
18 Window for restricting illuminated region
19 Quadrangular pyramidal region indicating illuminated region which is produced as a result of restriction by window 18
20 Rectangle constituting cross-section of quadrangular pyramidal region 19 which is illuminated region
21 Infrared LED
22 Light-receiving device
23 Detected zone

The invention claimed is:

1. A device for measuring a time of passage of a runner comprising:
   an illumination device that provides illumination by infrared and/or visible light;
   a light-receiving device that detects infrared and/or visible light;
   a communication device;
   a timer that measures a time; and
   a display device that displays the time;
   wherein infrared and/or visible illumination provided by the illumination device is reflected from the body of a runner traveling therepast, passage of the runner is sensed as a result of detection of reflected infrared and/or visible light by the light-receiving device, sensed information is conveyed to the timer by way of the communication device, the time of passage of the runner is measured by the timer in correspondence to the sensing, and the display device displays the measured time,
   wherein a shape of a cross-section of the infrared and/or visible illumination is greater than or equal to the area of the palm of the hand of the runner at a location passed through by the runner, the cross section being orthogonal to a direction of transmission of the infrared and/or visible illumination by the illumination device, and
   wherein passage of the runner is sensed when the light-receiving device detects electric power produced by reflected infrared and/or visible light that is greater than or equal to a prescribed value.

2. A device for measuring the time of passage of a runner, comprising:
   an illumination device that provides illumination by infrared and/or visible light;
   a light-receiving device that detects infrared and/or visible light;
   a communication device;
   a timer that measures a time; and
   a display device that displays the time,
   wherein infrared and/or visible illumination provided by the illumination device is reflected from the body of a runner traveling therepast, passage of the runner is sensed as a result of detection of reflected infrared and/or visible light by the light-receiving device, sensed information is conveyed to the timer by way of the communication device, the time of passage of the runner is measured by the timer in correspondence to the sensing, and the display device displays the measured time,
   wherein passage of the runner is sensed when the light-receiving device detects electric power produced by reflected infrared and/or visible light that is greater than or equal to a prescribed value, and
   wherein the light-receiving device has a window that restricts direction of incidence thereon of infrared and/or visible light, wherein the window is shaped such that length thereof in a vertical direction is greater than length thereof in a horizontal direction.

3. The device for measuring the time of passage of the runner according to claim 2, wherein the illumination device has a window that restricts a region illuminated by infrared and/or visible light, wherein the region illuminated by infrared and/or visible light produced as a result of restriction by the window is shaped such that length thereof in a vertical direction is greater than length thereof in a horizontal direction.

4. A device for measuring the time of passage of a runner, comprising:
   an illumination device that provides illumination by infrared and/or visible light;
   a light-receiving device that detects infrared and/or visible light;
   a communication device;
   a timer that measures a time; and
   a display device that displays the time,
   wherein infrared and/or visible illumination provided by the illumination device is reflected from the body of a runner traveling therepast, passage of the runner is sensed as a result of detection of reflected infrared and/or visible light by the light-receiving device, sensed information is conveyed to the timer by way of the communication device, the time of passage of the runner is measured by the timer in correspondence to the sensing, and the display device displays the measured time,
   wherein passage of the runner is sensed when the light-receiving device detects electric power produced by reflected infrared and/or visible light that is greater than or equal to a prescribed value, and
   wherein the illumination device has a window that restricts a region illuminated by infrared and/or visible light, wherein the region illuminated by infrared and/or visible light produced as a result of restriction by the window is shaped such that length thereof in a vertical direction is greater than length thereof in a horizontal direction.

* * * * *